(12) United States Patent
Wu

(10) Patent No.: US 10,364,879 B2
(45) Date of Patent: Jul. 30, 2019

(54) HOUSING FOR A GEAR UNIT

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/034,842

(22) PCT Filed: Oct. 21, 2014

(86) PCT No.: PCT/EP2014/002828
§ 371 (c)(1),
(2) Date: May 5, 2016

(87) PCT Pub. No.: WO2015/067341
PCT Pub. Date: May 14, 2015

(65) Prior Publication Data
US 2016/0258525 A1 Sep. 8, 2016

(30) Foreign Application Priority Data
Nov. 8, 2013 (DE) ........................ 10 2013 018 709

(51) Int. Cl.
*F16H 57/021* (2012.01)
*F16H 57/03* (2012.01)
F16H 57/02 (2012.01)

(52) U.S. Cl.
CPC ........... *F16H 57/03* (2013.01); *F16H 57/021* (2013.01); *F16H 2057/02073* (2013.01); *F16H 2057/02091* (2013.01)

(58) Field of Classification Search
CPC ............................. F16H 57/03; F16H 57/021
See application file for complete search history.

(56) References Cited

U.S. PATENT DOCUMENTS 7,810,412 B2 * 10/2010 Yamasaki ........... F16H 57/0006
464/180
2012/0024097 A1 * 2/2012 Strau ................... F16H 57/0447
74/467

(Continued)

FOREIGN PATENT DOCUMENTS

CN          201277320 Y     7/2009
DE    10 2008 004 337     10/2008

OTHER PUBLICATIONS

International Search Report, dated Apr. 23, 2015, issued in corresponding International Application No. PCT/EP2014/002828.

(Continued)

*Primary Examiner* — Vicky A Johnson
(74) *Attorney, Agent, or Firm* — Hunton Andrews Kurth LLP

(57) ABSTRACT

A housing for a gear unit includes a housing top part mounted on a housing bottom part, a first bearing mounting for a first bearing of a shaft being formed by a first bearing carrier of the housing top part and a first bearing carrier of the housing bottom part, a second bearing mounting for a second bearing of a shaft being formed by a second bearing carrier of the housing top part and a second bearing carrier of the housing bottom part, a first end area of a first bearing carrier of the housing bottom part and a first end area of a second bearing carrier of the housing bottom part being joined by two end plates set apart from each other.

11 Claims, 2 Drawing Sheets

(56) References Cited

U.S. PATENT DOCUMENTS

2016/0265650 A1* 9/2016 Wu .................... F16H 57/0421
2016/0273643 A1* 9/2016 Wu ........................ F16H 57/03
2016/0273646 A1* 9/2016 Wu ........................ F16H 57/03
2016/0281838 A1* 9/2016 Wu ........................ F16H 57/03
2016/0290479 A1* 10/2016 Wu .................... F16H 57/0409

OTHER PUBLICATIONS

International Preliminary Report on Patentability and Written Opinion issued in International Application No. PCT/EP2014/002828, dated May 27, 2016.

* cited by examiner

HOUSING FOR A GEAR UNIT

FIELD OF THE INVENTION

The present invention relates to a housing for a gear unit.

BACKGROUND INFORMATION

It is generally known that in a housing for a gear unit, bearing mountings are able to be provided for accommodating bearings of a shaft of the gear unit such as the output shaft, intermediate shaft or input shaft.

SUMMARY

Example embodiments of the present invention provide a housing for a gear unit, which may protect the environment.

Among features of example embodiments of the present invention with regard to the housing for a gear unit are that the housing has a housing top part mounted on a housing bottom part, a first bearing mounting for a first bearing of a shaft being formed by a first bearing carrier of the housing top part and a first bearing carrier of the housing bottom part, a second bearing mounting for a second bearing of a shaft being formed by a second bearing carrier of the housing top part and a second bearing carrier of the housing bottom part, a first end area of a first bearing carrier of the housing bottom part and a first end area of a second bearing carrier of the housing bottom part being joined by two end plates set apart from each other.

An advantage in this context is that high mechanical stability and low torsional stiffness are achievable. The rest of the housing without the stiffening sections is able to be realized with thin wall thickness, e.g., with a maximum wall thickness that is less than the maximum or minimum wall thickness of the stiffening sections, especially such as bearing carriers, end plates, base plate, spacers, supporting bars and supporting sections. In this manner, the amount of material used, and therefore the consumption of resources, is thus able to be reduced, which protects the environment.

A second, e.g., the other end area of the first bearing carrier of the housing bottom part and a second, e.g., the other end area of the second bearing carrier of the housing bottom part may be joined by two end plates set apart from each other. An advantage in this case is that stability is increased by the end plates effective as cross bracings.

A first end area of a first bearing carrier of the housing top part and a first end area of a second bearing carrier of the housing top part may be joined by two end plates set apart from each other, a second, e.g., the other end area of the first bearing carrier of the housing top part and a second, e.g., the other end area of the second bearing carrier of the housing top part being joined by two end plates set apart from each other. An advantage in this instance is that the housing top part rests on the housing bottom part, therefore permitting a tight connection, accompanied at the same time by high stability.

At least one of the end plates of the housing top part may contact one of the end plates of the housing bottom part.

Between end plates of the housing top part, which are joined at the first end areas of the bearing carriers of the housing top part, spacers may be disposed, and/or between end plates of the housing bottom part, which are joined at the first end areas of the bearing carriers of the housing bottom part, spacers may be disposed. This is considered advantageous because the weight force of the upper end plate in each instance is substantially able to be dissipated via the spacers. No substantial forces are able to be dissipated via the other areas of the housing bottom part with thin wall thickness.

The bearing carriers of the housing bottom part may be joined by supporting bars and/or supporting sections to base plates of the housing bottom part, especially in order to dissipate the weight force of the bearing carriers. An advantage in this instance is that the weight force is able to be dissipated through these thickened areas, so that the other surface sections of the housing bottom part may be realized with thin wall thickness, e.g., with a maximum wall thickness that is less than the greatest wall thickness of the housing bottom part.

The bearing carriers, end plates, spacers, supporting bars, supporting sections and base plate of the housing bottom part may be implemented integrally, especially in one piece, particularly as a steel casting. This is considered advantageous because the housing bottom part is able to be formed as a steel casting and requires only modest reworking.

The bearing carriers, end plates and spacers of the housing top part may be implemented integrally, especially in one piece, particularly as a steel casting. An advantage in this case is that the housing top part is able to be formed as a steel casting and requires only modest reworking.

The end plates may extend further in one direction that is aligned perpendicular to the direction which is assigned to the furthest extension of the bearing carriers, in particular, the supporting bars and/or supporting sections extending mainly in a direction which is aligned perpendicular to the two directions. An advantage is that high stability is achieved.

The housing bottom part may be formed in shell-like fashion, the remaining areas of the housing bottom part having less wall thickness than the wall thickness of the end plate, the bearing carriers and/or the supporting sections and/or the supporting bars. An advantage in this instance is that the housing is able to be assembled from two shells. In this connection, the lower shell accommodates the oil pan.

Example embodiments of the present invention are explained in greater detail below with reference to the Figures

DETAILED DESCRIPTION

Figure 1:
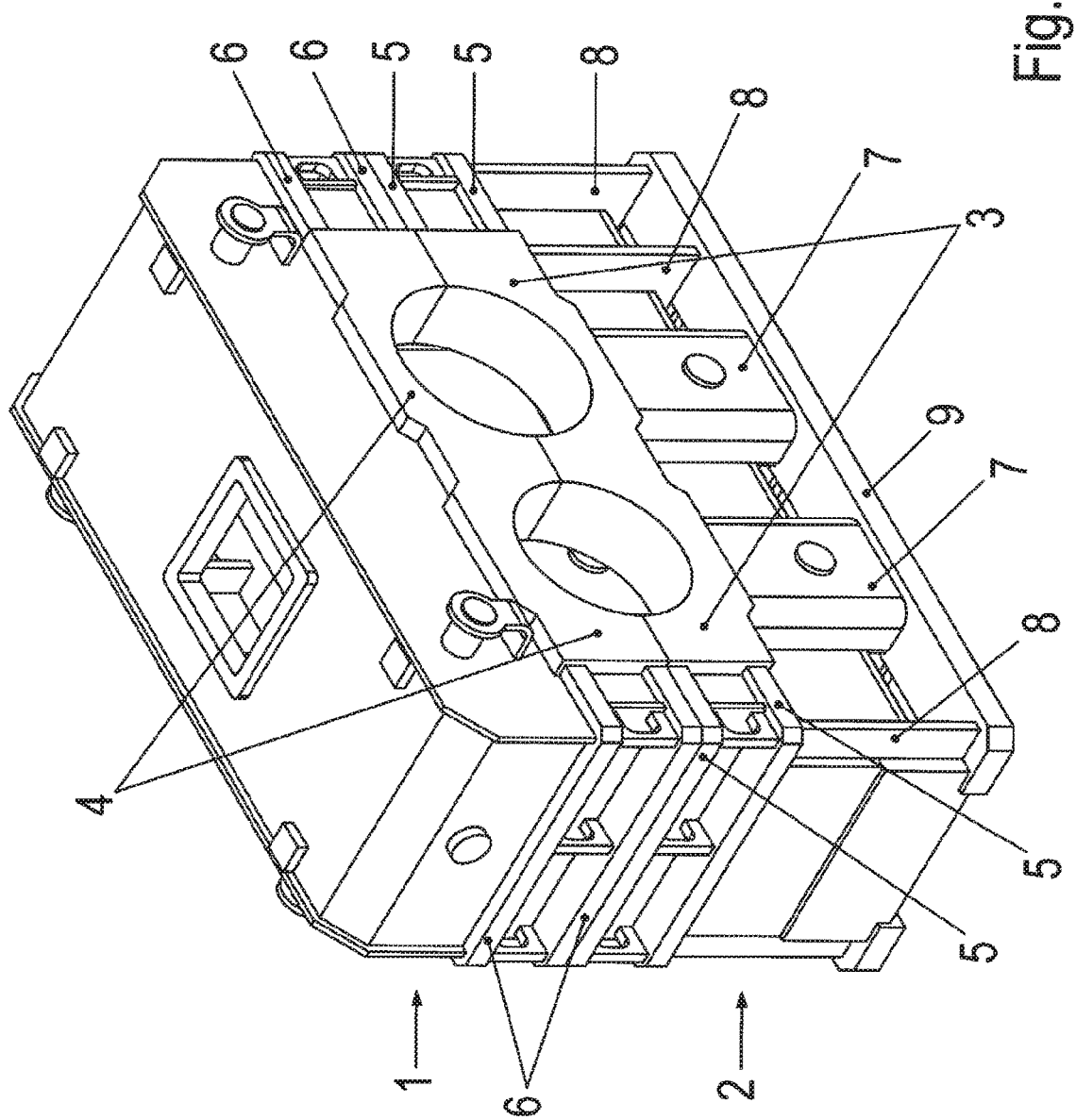
FIG. 1 shows a gear-unit housing in oblique view.
Figure 2:
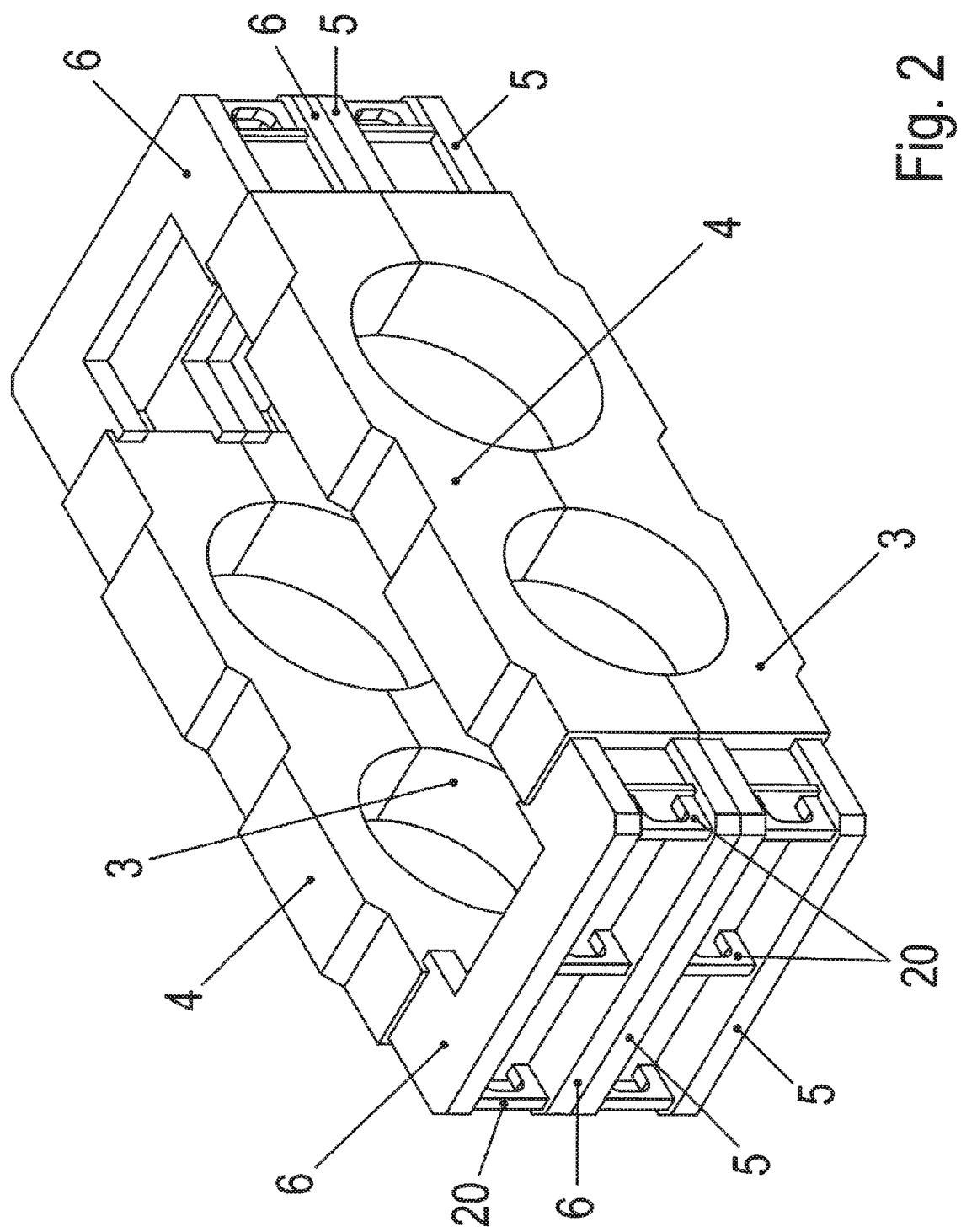
FIG. 2 shows the bearing mounting of the gear-unit housing in an enlarged oblique view.

The housing has a housing bottom part 2, on which a housing top part 1 is placed.

In order to support shafts of the gear unit with the aid of rolling-contact bearings, especially ball bearings or angular-contact bearings, etc., bearing mountings are formed on the gear-unit housing and finely machined accordingly.

A first part of each bearing mounting is formed as bearing carrier 3 that has two semi-cylindrical openings for accommodating two bearings, and is disposed in housing bottom part 2.

A further part of each bearing mounting is formed as bearing carrier 4 that has two semi-cylindrical openings for accommodating two bearings, and is disposed in housing top part 1.

When mounting housing top part 1 on housing bottom part 2, upper bearing carrier 4 is placed on lower bearing carrier 3, so that the parts of the respective bearing mountings abut against each other and form the specific bearing mounting. Each bearing mounting encircles a cylindrical spatial area into which a bearing is able to be inserted, and thus a shaft is able to be supported via the bearing in the bearing mounting of the housing.

The two bearing carriers 4 of housing top part 1, aligned parallel to each other, are joined at their first end area by two end plates 6 that are aligned parallel to each other and are set apart from each other. Bearing carriers 4 are joined by two end plates 6, aligned parallel to each other and set apart from each other, at their other end area, as well. End plates 6 extend in a first direction more than in any other direction transverse to it. Bearing carriers 4 extend in a second direction more than in any other direction transverse to the second direction. The first and second directions are aligned perpendicular to each other.

The two bearing carriers 3 of housing top part 2, aligned parallel to each other, are joined at their first end area by two end plates 5 that are aligned parallel to each other and are set apart from each other. Bearing carriers 3 are joined by two end plates 5, aligned parallel to each other and set apart from each other, at their other end area, as well. End plates 5 extend in the first direction more than in any other direction transverse to it. Bearing carriers 3 extend in the second direction more than in any other direction transverse to the second direction.

Thus, bearing carriers 3 of housing bottom part 2 are joined by a double-decker structure, and bearing carriers 3 of housing bottom part 2 are joined by a double-decker structure. A uniform dissipation of forces, which are introduced via the shafts and their bearings into the bearing mounting, is thereby achievable in the housing. The stability and rigidity of the housing are therefore increased.

Housing top part 1 is realized in shell-like fashion. Bearing carriers 4 and end plates 6 are formed as condensed areas, thus, thickened areas, in the casting. The remaining areas of housing top part 1 are implemented with thin wall thickness. That means that the greatest wall thickness of the remaining areas is less than the greatest wall thickness of the housing in the area of bearing carriers 4 and end plates 6.

Housing bottom part 2 is realized in shell-like fashion. Bearing carriers 3 and end plates 5 are formed as condensed areas, e.g., thickened areas, in the casting. The remaining areas of housing bottom part 2 are implemented with thin wall thickness. That means that the greatest wall thickness of the remaining areas is less than the greatest wall thickness of the housing in the area of bearing carriers 3 and end plates 5.

End plates 6 are set apart from each other by spacers 20, which also transfer weight force of one of end plates 6.

End plates 5 are likewise set apart from each other by spacers 20, which also transfer weight force of one of end plates 5.

The weight force of bearing carriers 5 is dissipated to base plate 9 with the aid of supporting bars 7 and supporting sections 8.

These supporting sections 8 and supporting bars 7, as well as base plate 9 are not numbered among the remaining areas having thin wall thickness. These supporting sections 8 and supporting bars 7 as well as base plate 9 are implemented with very great thickness in order to achieve high stability.

The remaining areas, supporting sections 8, supporting bars 7, base plate 9 as well as bearing carriers 3 and end plates 5 plus associated spacers 20 are implemented integrally, e.g., in one piece, as housing bottom part 2.

In the same manner, housing top part 1, including end plates 6, bearing carriers 4, associated spacers 20 and the remaining areas with thin wall thickness, is realized integrally, e.g., in one piece, to form shell-like housing top part 1.

On its upper side, housing top part 1 has an opening tightly closable by a sealing cover part.

Supporting bars 7 stretch in a direction perpendicular to the first and perpendicular to the second direction, e.g., are extended further in this direction than in the first or second direction.

Supporting sections 8 stretch in a direction perpendicular to the first and perpendicular to the second direction, e.g., are extended further in this direction than in the first or second direction.

LIST OF REFERENCE NUMERALS

1 housing top part
2 housing bottom part
3 bearing carrier
4 bearing carrier
5 end plate on housing bottom part 2
6 end plate on housing top part 1
7 supporting bar
8 supporting section
9 base plate
20 spacer

What is claimed is:

1. A housing for a gear unit, comprising:
    a housing top part mounted on a housing bottom part;
    a first bearing mounting for a first bearing of a shaft being formed by a first bearing carrier of the housing top part and a first bearing carrier of the housing bottom part; and
    a second bearing mounting for a second bearing of a shaft being formed by a second bearing carrier of the housing top part and a second bearing carrier of the housing bottom part;
    wherein a first end area of the first bearing carrier of the housing bottom part and a first end area of the second bearing carrier of the housing bottom part are joined by two end plates set apart from each other.

2. The housing according to claim 1, wherein a second end area of the first bearing carrier of the housing bottom part and a second end area of the second bearing carrier of the housing bottom part are joined by two end plates set apart from each other.

3. The housing according to claim 1, wherein a first end area of a first bearing carrier of the housing top part and a first end area of the second bearing carrier of the housing top part are joined by two end plates set apart from each other, and a second end area of the first bearing carrier of the housing top part and a second end area of the second bearing carrier of the housing top part are joined by two end plates set apart from each other.

4. The housing according to claim 1, wherein at least one of the end plates of the housing top part contacts one of the end plates of the housing bottom part.

5. The housing according to claim 1, wherein between end plates of the housing top part, which are joined at the first end areas of the bearing carriers of the housing top part, spacers are disposed, and/or between end plates of the housing bottom part, which are joined at the first end areas of the bearing carriers of the housing bottom part, spacers are disposed.

6. The housing according to claim 1, wherein the bearing carriers of the housing bottom part are joined by supporting bars and/or supporting sections to base plates of the housing bottom part, in order to dissipate a weight force of the bearing carriers.

7. The housing according to claim 1, wherein the bearing carriers, end plates, spacers, supporting bars, supporting sections, and base plate of the housing bottom part are implemented integrally, in one piece, and/or as a steel casting.

8. The housing according to claim 1, wherein the bearing carriers, end plates and spacers of the housing top part are implemented integrally, in one piece, and/or as a steel casting.

9. The housing according to claim 1, wherein the end plates extend further in one direction that is aligned perpendicular to a direction corresponding to a furthest extension of the bearing carriers, and/or supporting bars and/or supporting sections extend mainly in a direction aligned perpendicular to the two directions.

10. The housing according to claim 1, wherein the housing bottom part is arranged as a shell, remaining areas of the housing bottom part having a smaller wall thickness than a wall thickness of the end plate, the bearing carriers, supporting sections, and/or supporting bars.

11. The housing according to claim 2, wherein a first end area of a first bearing carrier of the housing top part and a first end area of the second bearing carrier of the housing top part are joined by two end plates set apart from each other, and a second end area of the first bearing carrier of the housing top part and a second end area of the second bearing carrier of the housing top part are joined by two end plates set apart from each other.

* * * * *